United States Patent [19]

Seo et al.

[11] Patent Number: 5,325,695

[45] Date of Patent: Jul. 5, 1994

[54] DEVICE FOR MANUFACTURING LUBRICANT SUPPLY GROOVES IN FLUID BEARINGS

[75] Inventors: Young-sun Seo; Sang-cherl Han, both of Suwon, Rep. of Korea

[73] Assignee: Samsung Electronics Co., Ltd., Kyungki-do, Rep. of Korea

[21] Appl. No.: 961,850

[22] Filed: Oct. 16, 1992

[30] Foreign Application Priority Data

Feb. 19, 1992 [KR] Rep. of Korea ............... 92-2596

[51] Int. Cl.$^5$ ............................................. B21D 17/02
[52] U.S. Cl. .................................................... 72/112
[58] Field of Search ............... 72/75, 112, 117, 113, 72/125, 370, 479

[56] References Cited

U.S. PATENT DOCUMENTS

| | | | |
|---|---|---|---|
| 1,120,271 | 12/1914 | Buescher | 72/117 |
| 3,289,451 | 12/1966 | Koch et al. | 72/370 |
| 3,626,564 | 12/1971 | Daniel | 72/370 |
| 3,797,297 | 3/1974 | Wightman et al. | 72/113 |
| 3,824,827 | 7/1974 | Stockbridge et al. | 72/112 |

FOREIGN PATENT DOCUMENTS

| | | | |
|---|---|---|---|
| 0189816 | 8/1986 | Japan | 72/370 |
| 0230218 | 9/1988 | Japan | 72/75 |
| 0230219 | 9/1988 | Japan | 72/75 |

*Primary Examiner*—Lowell A. Larson
*Attorney, Agent, or Firm*—Sughrue, Mion, Zinn Macpeak & Seas

[57] ABSTRACT

A system for manufacturing lubricant supply grooves in a fluid bearing, in which a worn working body can be replaced. A through-hole is formed in the tool body so as to receive the working body, and a working portion is formed having a predetermined curvature at both ends of the working body. Both ends of the working body protrude to the same height from the outer circumferential surface of the tool body.

5 Claims, 2 Drawing Sheets

DEVICE FOR MANUFACTURING LUBRICANT SUPPLY GROOVES IN FLUID BEARINGS

BACKGROUND OF THE INVENTION

1. Field of the Invention

The present invention relates to a device for manufacturing lubricant supply grooves in a fluid bearing in which high speed rotation with high precision is required. More particularly, the invention relates to a device for manufacturing lubricant supply grooves in a fluid bearing in which a working portion is replaceable when it becomes worn, and a number of lubricant supply grooves of a spiral or circular type, can be formed at one time.

2. Description of Related Art

A head drum assembly of a tape recorder such as a video tape recorder (VTR) or a digital audio tape (DAT) recorder requires high speed rotation with high precision, so as to record/reproduce a tape having a high density format. Thus, a ball bearing is disposed between the head drum and the rotation axis, for providing a friction-reduced rolling interface. However, since the head drum assembly utilizing a ball bearing requires space for accommodating the ball, the assembly increases in size, and noise is generated due to a gap required for the ball's rolling motion. Also, rotation accuracy is lowered due to wear on the ball.

Thus, recently, lubricant supply grooves have been formed wherein fluid flows along the inner wall of the sleeve, and a high speed and high precision fluid bearing has been used for reducing the fluid friction between the rotating axis and the sleeve.

A conventional manufacturing device used for the formation of such lubricant supply grooves is shown in FIG. 1. A number of holes are formed on the outer circumferential surface of tool body 1. A ball 4 is inserted from the interior of tool body 1 into respective holes. A support 3 is fitted into the interior of tool body 1 so as to support ball 4. Here, since the diameter of the hole is smaller than that of ball 4, the latter is held within tool body 1.

The lubricant supply groove manufacturing device as described above is used in the following manner. A sleeve 2 is fixed with a chuck (not shown). When pressure is exerted on tool body 1 to advance it in the axial direction of sleeve 2, the inner wall of sleeve 2 is plastically deformed so that supply grooves 5 are formed. If the chuck is also rotated while exerting pressure on tool body 1 to advance it in the axial direction of sleeve 2, the lubricant supply grooves 5 formed on the inner wall of sleeve 2 may be spirally shaped. Accordingly, various types of lubricant supply grooves 5 may be formed in accordance with the rotating condition of the chuck.

However, during plastic processing work, ball 4 and support 3 can become worn or deformed due to friction between the inner wall of sleeve 2 and ball 4. Accordingly, supply grooves 5 are not uniformly manufactured, thereby lowering the bearing performance. Thus, a worn ball 4 must be replaced. As shown in the drawing, in the conventional lubricant supply groove manufacturing device, since a number of balls 4 are inserted into respective holes from the interior of tool body 1, and each is supported by support 3, replacement is difficult. Thus, the tool is not highly efficient.

Also, because of practical limitations it is very difficult to manufacture and manipulate very small balls. Accordingly, certain desirable formations of very small lubricant supply grooves 5 cannot be provided with the above-described conventional device.

SUMMARY OF THE INVENTION

Therefore, to solve the above problems, it is an object of the present invention to provide a device for manufacturing lubricant supply grooves in a fluid bearing in which a working portion is easily exchanged with a new one, and lubricant supply grooves having small sizes are simply manufactured.

To accomplish the above objects of the present invention, there is provided a device for manufacturing lubricant supply grooves in a fluid bearing having a plurality of working bodies and a tool body into which the working bodies are inserted to form lubricant supply grooves on an inner wall of a piece to be worked. At least one through-hole is formed in the tool body, and working portions are formed having a predetermined curvature at both ends of each of the working bodies and inserted into a respective through-hole so that both ends of the working bodies protrude to the same height from the outer surface of the tool body.

In another embodiment of the present invention, the tool body is also integrally provided with a number of fixed working portions.

According to the present invention, the working bodies are able to be separated from the tool body, and a number of lubricant supply grooves may be formed through a single working operation. Thus, in the present invention, the worn-out working bodies can be easily replaced if necessary. The present invention also provides a device for manufacturing lubricant supply grooves in a fluid bearing wherein a number of lubricant supply grooves can be formed through a single working operation.

BRIEF DESCRIPTION OF THE DRAWINGS

The above object and other advantages of the present invention will become more apparent by describing in detail preferred embodiments of the present invention with reference to the attached drawings in which.

DETAILED DESCRIPTION OF THE PREFERRED EMBODIMENTS

Figure 1:
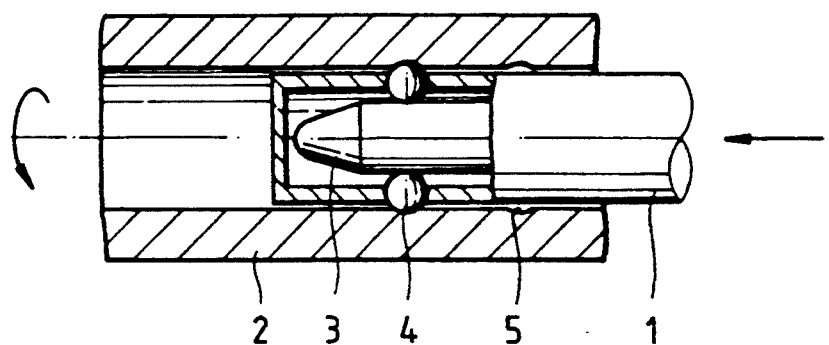
FIG. 1 is a cross-sectional view of a conventional lubricant supply groove manufacturing device.
Figure 2:
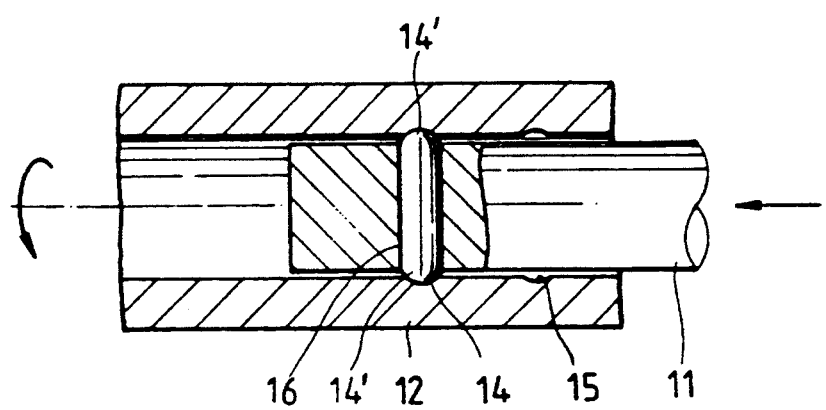
FIG. 2 is a cross-sectional view illustrating a device for manufacturing lubricant supply grooves in a fluid bearing according to a first embodiment of the present invention.

FIG. 2 illustrates a device for manufacturing lubricant supply grooves in a fluid bearing according to the first embodiment of the present invention. A sleeve 12 is adapted for supporting a rotating axis (not shown) of a rotary drum (not shown) of a tape recorder such as a VTR. A number of lubricant supply grooves 15 are formed on the inner wall of the sleeve 12. Thus, the rotary drum can be rotated due to a fluid friction bearing formed by the lubricant between the rotating axis and sleeve 12.

In FIG. 2, a through-hole 16 is formed at one end of a tool body 11. An elongated working body 14, each end of which is provided with a working portion 14' having a predetermined curvature, is inserted into through-hole 16. At this time, each working portion 14' of working body 14 projects from the outer circumferential surface of tool body 11 to a predetermined height. On the other hand, working body 14 which is pressed into tool body 11, is replaceable. Also, since elongated working body 14 is more easily manufactured than ball 4, working portion 14' can be formed so as to have a smaller and more precise curvature than the ball. Thus, elongated working body 14 enables the manufacture of smaller supply grooves than are possible with the conventional ball type working body.

Figure 3:
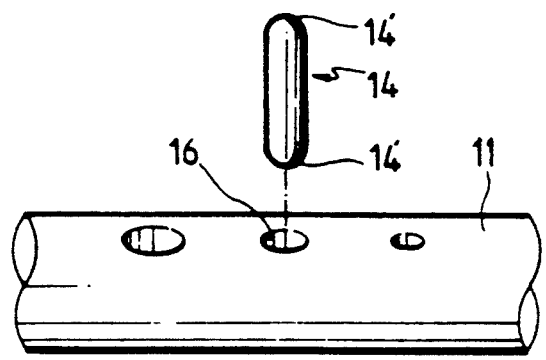
FIG. 3 is a perspective view showing essential parts of a second embodiment of the present invention.

A second embodiment of the present invention is shown in FIG. 3. A plurality of through-holes 16 having different sizes are formed in tool body 11. Thus, different sized working bodies 14, each having a working portion 14' of the desired curvature can be selectively inserted in the proper through hole 16 in tool body 11.

Figure 4:
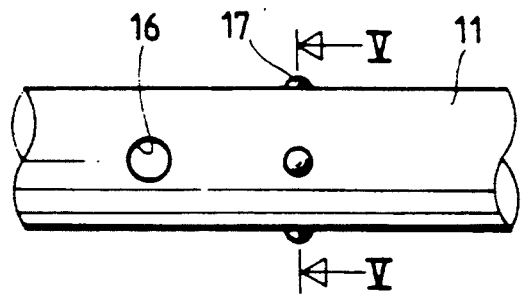
FIG. 4 is a perspective view showing essential parts of a third embodiment of the present invention.
Figure 5:
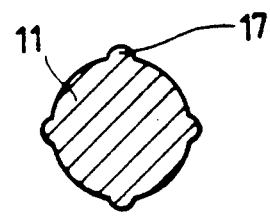
FIG. 5 is a cross-sectional view taken along line V—V shown in FIG. 4.

FIGS. 4 and 5 show a third embodiment of the present invention. As shown in FIGS. 4 and 5, tool body 11 is provided with a number of fixed extending working bodies 17 integrally formed therewith, as well as being provided with through-hole 16 through which at least one elongated working body 14 is removably inserted. Such a fixed working body 17 can be formed by means of supersonic welding, for example. Thus, fixed working body 17 facilitates the manufacture of smaller sized working bodies than was possible with the conventional ball type device, thereby being capable of forming a small supply recess. Working portion 14' of elongated working body 14 and fixed working body 17 are made of a high-hardness alloy material, with sleeve 12 being made of a softer material.

In the present invention described above, sleeve 12 (FIG. 2) is fixed by a chuck, and tool body 11 is inserted with pressure into the sleeve along its axial direction. At this time, the inner wall of sleeve 12 is plastically deformed by means of the longitudinal pressure of elongated working body 14, thereby forming lubricant supply grooves 15. The formation of lubricant supply grooves 15 wears down working portion 14' of working body 14. However, elongated working body 14 can be easily replaced when worn. Also, the elongated working body 14 having a desired size can be selectively used in a single tool body 11 and is also easily replaceable, as illustrated in FIG. 3.

Also, in the embodiment shown in FIGS. 4 and 5, fixed working body 17 is formed on tool body 11 by means of supersonic welding, thereby allowing the formation of very small lubricant supply grooves, which cannot be formed with the working body of the conventional ball type. Also, a number of fixed working bodies 17 can be formed on tool body 11, thereby forming various configurations of supply grooves 15. During the formation of supply grooves 15 as described above, fixed working body 17 wears out. In this case, if elongated working body 14 is inserted into through-hole 16 formed in tool body 11, the tool can be continuously used for larger supply groove formation with replaceable working body 14.

As described above, in the present invention, when the working body is worn during the course of forming lubricant supply grooves, the worn working body can be replaced to further the tool's usage. Accordingly, the life of the tool is extended, and a large number of configurations of lubricant supply grooves can be formed at one-time, thereby enhancing working efficiency. Also, the tool can be rotated with respect to the sleeve so as to form spiral grooves in the sleeve.

While the invention has been described through preferred embodiments, it will be apparent to those skilled in the art that various modifications can be made without departing from the scope of the invention as defined by the appended claims.

What is claimed is:

1. A process of forming lubricant supply grooves in a member of a fluid bearing, comprising the steps of:
   inserting a working body into a through hole of a tool body so that working portions formed on opposite ends of said working body project from an outer surface of said tool body, said working portions corresponding in shape to the lubricant supply grooves;
   drawing said tool body through the member so as to plasticly deform portions of an inner surface of said member, due to contact with said working portions, to define said supply grooves.

2. A process as claimed in claim 1, further comprising the step of:
   rotating said tool body relative to said member during said drawing step.

3. A process as claimed in claim 1, wherein at least one fixed working portion is integrally formed on the tool body.

4. A process as claimed in claim 3, wherein said fixed working portion is fixed to the tool body by supersonic welding.

5. A device for manufacturing lubricant supply grooves in a fluid bearing member, comprising:
   a tool body having a plurality of through holes formed therein, at least one of said through holes having a diameter which is different from another one of said through holes; and
   at least one working body inserted in a corresponding one of said through holes so that curved working portions formed on each end of said working body project from an outer surface of said tool body.

* * * * *